United States Patent
Yang

(10) Patent No.: US 11,140,643 B2
(45) Date of Patent: Oct. 5, 2021

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/918,330

(22) Filed: Jul. 1, 2020

(65) Prior Publication Data

US 2020/0337001 A1 Oct. 22, 2020

Related U.S. Application Data

(63) Continuation of application No. PCT/CN2018/072158, filed on Jan. 10, 2018.

(51) Int. Cl.
*H04W 56/00* (2009.01)
*H04W 68/00* (2009.01)
(Continued)

(52) U.S. Cl.
CPC ....... *H04W 56/001* (2013.01); *H04W 68/005* (2013.01); *H04W 72/005* (2013.01); *H04W 88/02* (2013.01)

(58) Field of Classification Search
CPC ............. H04W 56/001; H04W 68/005; H04W 72/005; H04W 8/26; H04W 88/02
(Continued)

(56) References Cited

U.S. PATENT DOCUMENTS

| 10,887,035 | B2* | 1/2021 | Islam | H04B 7/2615 |
| 2011/0295397 | A1* | 12/2011 | Goldberg | G10H 1/0025 |
| | | | | 700/94 |

(Continued)

FOREIGN PATENT DOCUMENTS

| CN | 101237604 A | 8/2008 |
| CN | 106688288 A | 5/2017 |

(Continued)

OTHER PUBLICATIONS

International Search Report for PCT/CN2018/072158 dated Sep. 21, 2018.
(Continued)

*Primary Examiner* — Nghi H Ly
(74) *Attorney, Agent, or Firm* — Young Basile Hanlon & MacFarlane, P.C.

(57) ABSTRACT

A wireless communication method is provided, wherein a terminal device resides on a frequency point of a first SSB in a broadband carrier of a first cell comprising multiple SSBs including the first SSB, the method comprises: the terminal device acquiring first system information broadcast by the network device from the first SSB, comprising first indication information indicating a frequency point position of each SSB other than the first SSB relative to the first SSB and/or its absolute frequency point position; acquiring second system information broadcast by the network device from the first SSB, comprising configuration information instructing the terminal device to stop residing on the frequency point of the first SSB and to reselect an SSB from the multiple SSBs for residing on; determining a second SSB through the configuration information, and residing on the frequency point of the second SSB indicated by the first indication information.

20 Claims, 3 Drawing Sheets

(51) Int. Cl.
*H04W 72/00* (2009.01)
*H04W 88/02* (2009.01)

(58) Field of Classification Search
USPC ............... 370/350, 329, 328, 338, 341, 345
See application file for complete search history.

(56) References Cited

U.S. PATENT DOCUMENTS

2016/0316431 A1   10/2016  Zhu et al.
2018/0220360 A1*   8/2018  Sheng ................... H04W 48/10
2018/0332514 A1*  11/2018  Maaref ................. H04W 48/10

FOREIGN PATENT DOCUMENTS

CN      106793058 A     5/2017
CN      107528682 A    12/2017
EP      2292034 A1      3/2011

OTHER PUBLICATIONS

3GPP TSG RAN WG2#99; R2-1709861; Berlin, Germany, Aug. 21-25, 2017.
3GPP TSG RAN WG1 Meeting 91; Reno, USA, Nov. 27-Dec. 1, 2017; R1-1720563.
3GPP TSG RAN WG1 NR Ad Hoc #3; Nagoya, Japan, Sep. 18-21, 2017; R1-1715609.
3GPP TSG RAN WG1 Meeting #90; Prague, Czechia Aug. 21-25, 2017; R1-1713804.
3GPP TSG RAN WG1 Meeting #90 R1-1712823; Prague, Czech Republic, Aug. 21-25, 2017.
3GPP TSG-RAN2#101 bis; Sanya, P. R. China, Apr. 15-Apr. 20, 2018; R2-1804561.
Extended European Search Report for EP Application 18899781.1 dated Dec. 15, 2020.

* cited by examiner

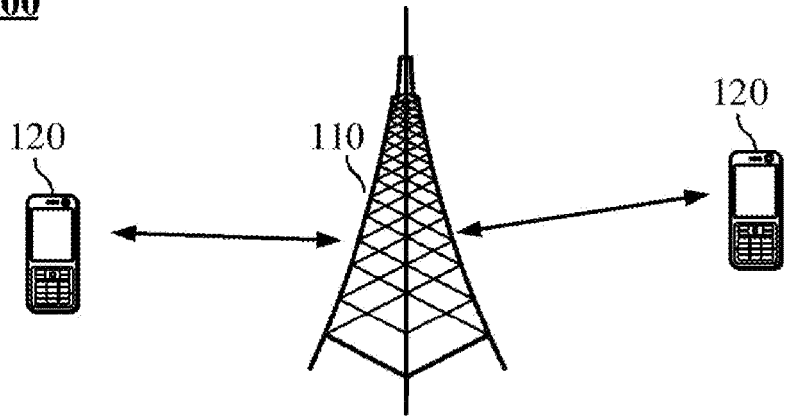

FIG. 1

200 — A terminal device acquires first system information broadcast by a network device from a first SSB, the first system information includes first indication information indicating a frequency point position of each SSB other than the first SSB in multiple SSBs relative to the first SSB, and/or an absolute frequency point position of each SSB other than the first SSB in the multiple SSBs. — 210

The terminal device acquires second system information broadcast by the network device from the first SSB, the second system information includes configuration information indicating the terminal device to stop residing on a frequency point of the first SSB and indicating to reselect an SSB in the multiple SSBs for residing. — 220

The terminal device determines a second SSB according to the configuration information, and resides on a frequency point of the second SSB according to a frequency point position of the second SSB indicated by the first indication information, and the second SSB is any one of the multiple SSBs. — 230

FIG. 2

WIRELESS COMMUNICATION METHOD, TERMINAL DEVICE AND NETWORK DEVICE

CROSS-REFERENCE TO RELATED APPLICATION(S)

This application is a continuation application of International Application No. PCT/CN2018/072158, filed on Jan. 10, 2018, the entire content of which is hereby incorporated by reference.

TECHNICAL FIELD

The present disclosure relates to the field of communication, and more particularly to a wireless communication method, a terminal device, and a network device.

BACKGROUND

In a 5-Generation New Radio (5G NR), the maximum channel bandwidth is 100 MHz for low frequency carriers, and the maximum channel bandwidth is 400 MHz for high frequency carriers. In the 5G NR communication, a requirement on power consumption of a terminal device (User Equipment, UE) is very high. If the terminal device always transmits data according to the maximum channel bandwidth of low frequency carriers or high frequency carriers, it is bound to cause great energy loss. Therefore, multiple Synchronous Signal Block (SSB) configurations are defined on the entire broadband carrier of the 5G NR broadband cell. After searching for an SSB, the terminal device acquires system broadcast information and resides on the SSB. Therefore, on the entire broadband carrier of the 5G NR broadband cell, the load of the terminal device is randomly distributed on frequency points on which all SSBs are located. However, this random distribution of the load of the terminal device will lead to a problem of unbalanced distribution of the load of the terminal device on all SSBs.

SUMMARY

Implementations of the present disclosure provide a wireless communication method, a terminal device and a network device. The network device indicates position information of all SSBs in a 5G NR broadband cell through system information and indicates a rule by which the terminal device carries out load redistribution on all SSBs in the 5G NR broadband cell, so that the terminal device can carry out load redistribution on all SSBs, thus achieving a purpose of load balancing of the terminal device on the 5G NR broadband cell.

In a first aspect, an implementation of the present disclosure provides a wireless communication method, wherein a terminal device resides on a frequency point of a first SSB in a broadband carrier of a first cell, and the broadband carrier of the first cell includes multiple SSBs including the first SSB.

The method includes: acquiring, by the terminal device, first system information broadcast by a network device from the first SSB, wherein the first system information includes first indication information indicating a frequency point position of each SSB other than the first SSB in the multiple SSBs relative to the first SSB, and/or an absolute frequency point position of each SSB other than the first SSB in the multiple SSBs; acquiring, by the terminal device, second system information broadcast by the network device from the first SSB, wherein the second system information includes configuration information indicating the terminal device to stop residing on the frequency point of the first SSB and indicating reselect an SSB in the multiple SSBs for residing; and determining, by the terminal device, a second SSB according to the configuration information, and residing on a frequency point of the second SSB according to a frequency point position of the second SSB indicated by the first indication information, wherein the second SSB is any one of the multiple SSBs.

Therefore, in the wireless communication method of an implementation of the present disclosure, the terminal device stops residing on the frequency point of the first SSB according to the configuration information, and determines the second SSB in the multiple SSBs, and resides on the frequency point of the second SSB according to the frequency point position of the second SSB indicated by the first indication information, so that the terminal device can redistribute the load on all SSBs, thus achieving a purpose of load balancing of the terminal device on the 5G NR broadband cell.

Optionally, in an implementation mode of the first aspect, before determining, by the terminal device, the second SSB according to the configuration information, the method further includes: acquiring, by the terminal device, a paging message sent by the network device from the first SSB, wherein the paging message includes second indication information for triggering the terminal device to respond to the configuration information; determining, by the terminal device, the second SSB according to the configuration information, includes: triggering, by the terminal device, to determine the second SSB according to the configuration information, according to the second indication information.

Therefore, according to the second indication information included in the paging message, the terminal device may trigger to determine the second SSB according to the configuration information, so that the terminal device can be flexibly controlled to redistribute the load on all SSBs.

Optionally, in an implementation mode of the first aspect, the configuration information indicates the terminal device to stop residing on the frequency point of the first SSB, and indicates the terminal device to randomly reselect an SSB in the multiple SSBs for residing. Determining, by the terminal device, the second SSB according to the configuration information, includes: stopping, by the terminal device, residing on the frequency point of the first SSB, and randomly selecting the second SSB in the multiple SSBs.

Optionally, in an implementation mode of the first aspect, the configuration information indicates the terminal device to stop residing on the frequency point of the first SSB, and indicates a correspondence relationship between M mod N and an index identifying each SSB in the multiple SSBs, wherein M represents an identity of the terminal device, N represents a quantity of the multiple SSBs, and mod represents a modulo operation. Determining, by the terminal device, the second SSB according to the configuration information, includes: the terminal device stops residing on the frequency point of the first SSB and determines the second SSB according to the correspondence relationship.

Optionally, in an implementation mode of the first aspect, the configuration information indicates the terminal device to stop residing on the frequency point of the first SSB and indicates a load threshold of each SSB in the multiple SSBs. Determining, by the terminal device, the second SSB according to the configuration information, includes: generating randomly, by the terminal device, a random number, and determining the second SSB according to the random number and the load threshold of each SSB in the multiple SSBs.

Optionally, in an implementation mode of the first aspect, the configuration information indicates the terminal device to stop residing on the frequency point of the first SSB, and indicates the terminal device to select the second SSB for residing. Determining, by the terminal device, the second SSB according to the configuration information, includes: determining, by the terminal device, the second SSB.

Optionally, in an implementation mode of the first aspect, the first system information is remaining system information (RMSI) corresponding to the first SSB.

Optionally, in an implementation mode of the first aspect, the first system information and the second system information are the same system information.

In a second aspect, an implementation of the present disclosure provides a wireless communication method, wherein at least one terminal device resides on a frequency point of a first synchronization signal block (SSB) in a broadband carrier of a first cell, wherein the broadband carrier of the first cell includes multiple SSBs including the first SSB.

The method includes: broadcasting, by a network device, first system information on the first SSB, wherein the first system information includes first indication information indicating a relative frequency point position of each SSB other than the first SSB in the multiple SSBs relative to the first SSB, and/or an absolute frequency point position of each SSB other than the first SSB in the multiple SSBs; and broadcasting, by the network device, second system information on the first SSB, wherein the second system information includes configuration information indicating the terminal device to stop residing on the frequency point of the first SSB and indicating to reselect an SSB in the multiple SSBs for residing.

Therefore, in the wireless communication method of an implementation of the present disclosure, the network device indicates the frequency point position of each SSB other than the first SSB in the multiple SSBs through the first indication information, so that the terminal device can determine the frequency point position of each SSB in the multiple SSBs. Further, the network device indicates the terminal device to stop residing on the frequency point of the first SSB and indicates to reselect an SSB in the multiple SSBs for residing through the configuration information, so that the terminal device can redistribute the load on all SSBs, thus achieving a purpose of load balancing of the terminal device in the 5G NR broadband cell.

Optionally, in an implementation mode of the second aspect, the second system information is used for triggering some or all of terminal devices residing on the frequency point of the first SSB to respond to the configuration information.

Therefore, the network device may trigger some or all of the terminal devices residing on the frequency point of the first SSB to respond to the configuration information through the second system information, so that multiple terminal devices can simultaneously reselect SSBs in the multiple SSBs for residing, and thus the load is redistributed on all of the SSBs.

Optionally, in an implementation mode of the second aspect, the method further includes: sending, by the network device, a paging message to the terminal device on the first SSB, wherein the paging message includes second indication information for triggering a first terminal device to respond to the configuration information, and the first terminal device belongs to the at least one terminal device.

Therefore, the network device may trigger the first terminal device to respond to the configuration information through the second indication information included in the paging message, so that the first terminal device can reselect an SSB in the multiple SSBs for residing.

Optionally, in an implementation mode of the second aspect, the configuration information indicates the terminal device to stop residing on the frequency point of the first SSB, and indicates the terminal device to randomly reselect an SSB in the multiple SSBs for residing.

Optionally, in an implementation mode of the second aspect, the configuration information indicates the terminal device to stop residing on the frequency point of the first SSB, and indicates a correspondence relationship between M mod N and an index identifying each SSB in the multiple SSBs, wherein M represents an identity of the terminal device, N represents a quantity of the multiple SSBs, and mod represents a modulo operation.

Optionally, in an implementation mode of the second aspect, the configuration information indicates the terminal device to stop residing on the frequency point of the first SSB and indicates a load threshold of each SSB in the multiple SSBs.

Optionally, in an implementation mode of the second aspect, the configuration information indicates the terminal device to stop residing on the frequency point of the first SSB, and indicates the terminal device to select the second SSB for residing.

Optionally, in an implementation mode of the second aspect, the first system information is remaining system information (RMSI) corresponding to the first SSB.

Optionally, in an implementation mode of the second aspect, the first system information and the second system information are the same system information.

In a third aspect, an implementation of the present disclosure provides a terminal device including a module or unit that may execute the method in the first aspect or any optional implementation mode of the first aspect.

In a fourth aspect, the implementation of the present disclosure provides a network device including a module or unit that may execute the method in the second aspect or any optional implementation mode of the second aspect.

In a fifth aspect, there is provided a terminal device including a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to perform the method in the first aspect or any possible implementation mode of the first aspect.

In a sixth aspect, there is provided a network device including a processor, a memory, and a communication interface. The processor is connected with the memory and the communication interface. The memory is used for storing instructions, and the processor is used for executing the instructions, and the communication interface is used for communicating with other network elements under the control of the processor. When the processor executes the instructions stored in the memory, the execution causes the processor to perform the method in the second aspect or any possible implementation mode of the second aspect.

In a seventh aspect, a computer storage medium is provided, and the computer storage medium has stored program codes for instructing a computer to execute instructions of a method in the first aspect or any possible implementation mode of the first aspect.

In an eighth aspect, a computer storage medium is provided, and the computer storage medium has stored program codes for instructing a computer to execute instructions of a method in the second aspect or any possible implementation mode of the second aspect.

In a ninth aspect, a computer program product including instructions is provided, wherein the computer program product, when being executed on a computer, causes the computer to perform the methods described in the above-mentioned various aspects.

BRIEF DESCRIPTION OF DRAWINGS

FIG. 1 is a schematic diagram of an application scenario according to an implementation of the present disclosure.

FIG. 2 is a schematic flowchart of a wireless communication method according to an implementation of the present disclosure.

DETAILED DESCRIPTION

Figure 3:
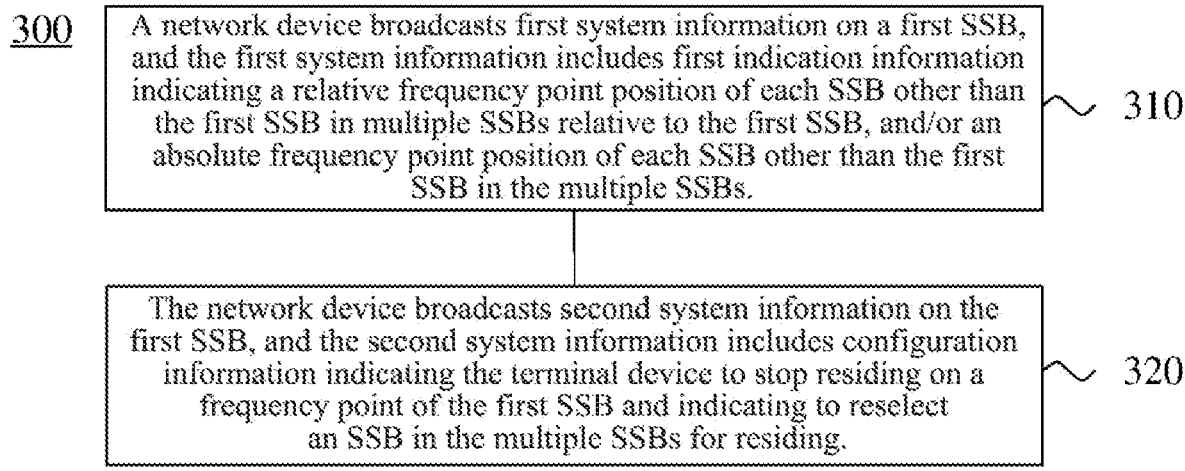
FIG. 3 is a schematic flowchart of another wireless communication method according to an implementation of the present disclosure.

Technical solutions in implementations of the present disclosure will be clearly and completely described below with reference to the drawings in the implementations of the present disclosure.

The technical solutions of the implementations of the present disclosure may be applied to various communication systems, such as a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system, or a 5G communication system.

A terminal device in an implementation of the present disclosure may be referred to a User Equipment (UE), an access terminal, a subscriber unit, a subscriber station, a mobile station, a mobile site, a remote station, a remote terminal, a mobile equipment, a user terminal, a terminal, a wireless communication equipment, a user agent or a user apparatus. An access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, an on-board device, a wearable device, a terminal device in a 5G network, or a terminal device in a Future Evolved Public Land Mobile Network (PLMN), etc., and this is not restricted in implementations of the present disclosure.

Various implementations are described herein in connection with an access network device in the present disclosure. The network device in implementations of the present disclosure may be a device for communicating with the terminal device, the network device may be an Evolutional NodeB (eNB or eNodeB) in a LTE system, may further be a radio controller in a scenario of a Cloud Radio Access Network (CRAN), or the access network device may be a relay station, an access point, an on-board device, a wearable device, a Next Generation Evolutional NodeB (NG-eNB), an access network device (e.g., gNB) in a 5G network or an access network device in the future evolved Public Land Mobile Network (PLMN), etc., and this is not restricted in implementations of the present disclosure.

FIG. 1 illustrates one network device and two terminal devices. Optionally, the wireless communication system 100 may include multiple network devices, and another quantity of terminal devices may be included within the coverage area of each network device, and this is not limited in implementations of the present disclosure.

Optionally, the wireless communication system 100 may further include other network entities such as a Mobility Management Entity (MME), an access and mobility management function (AMF), and this is not restricted in implementations of the present disclosure.

In addition, various aspects or features of the present disclosure may be implemented as methods, apparatuses, or products using standard programming and/or engineering techniques. The term "product" used in the present disclosure encompasses a computer program accessible from any computer-readable device, carrier, or medium. For example, the computer-readable medium may include, but is not limited to, a magnetic storage device (such as a hard disk, a floppy disk, or a magnetic tape), a disk (such as a compact disc (CD), a digital versatile disc (Digital Versatile Disc, DVD)), smart cards and flash storage devices (such as Erasable Programmable Read-Only Storage (EPROM), cards, sticks or key drives). In addition, various storage mediums described herein may represent one or more devices and/or other machine-readable mediums for storing information. The term "machine-readable medium" may include, but is not limited to, various media capable of storing, containing, and/or carrying instructions and/or data.

It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

FIG. 2 is a schematic flowchart of a wireless communication method 200 according to an implementation of the present disclosure. The method 200 may optionally be applied to the system shown in FIG. 1, but is not limited thereto. In the method 200, a terminal device resides on a frequency point of a first SSB in a broadband carrier of a first cell, and the broadband carrier of the first cell includes multiple SSBs including the first SSB. The method 200 includes at least some of the following contents.

In 210, the terminal device acquires first system information broadcast by a network device from the first SSB, the first system information includes first indication information indicating a frequency point position of each SSB other than the first SSB in the multiple SSBs relative to the first SSB, and/or an absolute frequency point position of each SSB other than the first SSB in the multiple SSBs.

It should be understood that if the terminal device resides on the frequency point of the first SSB, the terminal device has already known the frequency point position of the first SSB.

Therefore, the terminal device may know a frequency point position of each SSB in the multiple SSBs according to the first indication information.

Optionally, the SSB may be a Primary Synchronization Signal (PSS), a Secondary Synchronization Signal (SSS), or a Physical Broadcast Channel (PBCH).

Optionally, the first cell may be a 5G NR broadband cell.

Optionally, the first system message may be Remaining System Information (RMSI) corresponding to SSB1.

For example, there are three SSBs in the first cell, namely, SSB1, SSB2, and SSB3. A terminal device resides on the SSB1; RMSI corresponding to the SSB1 includes first indication information indicating a frequency point position of the SSB2 relative to the SSB1, a frequency point position of the SSB3 relative to the SSB1, or indicating absolute frequency point positions of the SSB2 and SSB3.

Therefore, after the terminal device stops residing on the SSB1 and reselects to reside on the SSB2, the frequency point position of the SSB2 may be accurately known, and then, the terminal device resides on the frequency point of the SSB2.

Optionally, the first system information is RMSI corresponding to the first SSB.

In 220, the terminal device acquires second system information broadcast by the network device from the first SSB, the second system information includes configuration information indicating the terminal device to stop residing on the frequency point of the first SSB and to reselect an SSB in the multiple SSBs for residing.

Optionally, the first system information and the second system information are the same system information.

Optionally, the configuration information indicates the terminal device to stop residing on the frequency point of the first SSB, and indicates the terminal device to randomly reselect an SSB in the multiple SSBs for residing.

For example, there are three SSBs in the first cell, namely, SSB1, SSB2, and SSB3. A UE randomly generates an integer between 1 and 3, inclusive, 1 corresponds to the SSB1, 2 corresponds to the SSB2, and 3 corresponds to the SSB3.

If the UE randomly generates 1, the UE selects the SSB1 for residing.

If the UE randomly generates 2, the UE selects the SSB2 for residing.

If the UE randomly generates 3, the UE selects the SSB3 for residing.

Optionally, the configuration information indicates the terminal device to stop residing on the frequency point of the first SSB, and indicates a correspondence relationship between M mod N and an index identifying each SSB in the multiple SSBs. Wherein M represents an identity of the terminal device (a User Equipment Identity, UE ID), N represents a quantity of the multiple SSBs, and mod represents a modulo operation.

For example, M mod N=1 corresponds to the SSB1, M mod N=2 corresponds to the SSB2, and M mod N=3 corresponds to the SSB3.

If M mod N=1, the UE selects the SSB1 for residing.
If M mod N=2, the UE selects the SSB2 for residing.
If M mod N=3, the UE selects the SSB3 for residing.

Optionally, the configuration information indicates the terminal device to stop residing on the frequency point of the first SSB and indicates a load threshold of each SSB in the multiple SSBs.

For example, there are three SSBs in the first cell, namely, SSB1, SSB2, SSB3, the load threshold of the SSB1 is 1, the load threshold of the SSB2 is 2, and the load threshold of the SSB3 is 3.

Herein, when the load threshold of SSB is 1, the load is large, when the load threshold of SSB is 2, the load is middle, and when the load threshold of SSB is 3, the load is small.

The UE randomly generates a number between 0 and 100, inclusive; a number between 0 and 20, inclusive, corresponds to the SSB with a load threshold of 1; a number between 21 and 50, inclusive, corresponds to the SSB with a load threshold of 2, and a number between 51 and 100, inclusive, corresponds to the SSB with a load threshold of 3 (i.e., a probability of randomly generating the number between 0 and 20, inclusive, by the UE is smallest, and a probability of randomly generating the number between 51 and 100, inclusive, by the UE is largest.)

If the UE randomly generates 15, the UE selects the SSB1 for residing.

If the UE randomly generates 33, the UE selects the SSB2 for residing.

If the UE randomly generates 98, the UE selects the SSB3 for residing.

Optionally, the configuration information indicates the terminal device to stop residing on the frequency point of the first SSB, and indicates the terminal device to select a second SSB for residing.

The terminal device directly resides on the frequency point of the second SSB according to the configuration information.

In 230, the terminal device determines a second SSB according to the configuration information, and resides on a frequency point of the second SSB according to a frequency point position of the second SSB indicated by the first indication information, wherein the second SSB is any one of the multiple SSBs.

Optionally, after the terminal device receives the configuration information, the terminal device is triggered by default to determine the second SSB according to the configuration information.

Optionally, the terminal device acquires a paging message sent by the network device from the first SSB, and the paging message includes second indication information for triggering the terminal device to respond to the configuration information; and the terminal device triggers, according to the second indication information, to determine the second SSB according to the configuration information.

Therefore, in the wireless communication method of the implementations of the present disclosure, the terminal device stops residing on the frequency point of the first SSB according to the configuration information, and determines the second SSB in the multiple SSBs, and resides on the frequency point of the second SSB according to the frequency point position of the second SSB indicated by the first indication information, so that the terminal device can redistribute the load on all SSBs, thus achieving a purpose of load balancing of the terminal device on the 5G NR broadband cell.

FIG. 3 is a schematic flowchart of a wireless communication method 300 according to an implementation of the present disclosure. The method 300 may optionally be applied to the system shown in FIG. 1, but is not limited thereto. In the method 300, at least one terminal device resides on a frequency point of a first SSB in a broadband carrier of a first cell, and the broadband carrier of the first cell includes multiple SSBs including the first SSB. The method 300 includes at least some of the following contents.

In 310, a network device broadcasts first system information on the first SSB, and the first system information includes first indication information indicating a relative frequency point position of each SSB other than the first SSB in the multiple SSBs relative to the first SSB, and/or an absolute frequency point position of each SSB other than the first SSB in the multiple SSBs.

In 320, the network device broadcasts second system information on the first SSB, and the second system information includes configuration information indicating the terminal device to stop residing on the frequency point of the first SSB and indicating to reselect an SSB in the multiple SSBs for residing.

Optionally, the second system information is used for triggering some or all of terminal devices residing on the frequency point of the first SSB to respond to the configuration information.

Therefore, the network device may trigger, through the second system information, some or all of the terminal devices residing on the frequency point of the first SSB to respond to the configuration information, so that multiple terminal devices may simultaneously reselect SSBs in the multiple SSBs for residing, and thus the load is redistributed on all of the SSBs.

Optionally, the method 300 further includes: the network device sends a paging message to the terminal device on the first SSB, wherein the paging message includes second indication information for triggering a first terminal device to respond to the configuration information, and the first terminal device belongs to the at least one terminal device.

Therefore, the network device may trigger, through the second indication information included in the paging message, the first terminal device to respond to the configuration information, so that the first terminal device may reselect an SSB in the multiple SSBs for residing.

Optionally, the configuration information indicates the terminal device to stop residing on the frequency point of the first SSB, and indicates the terminal device to randomly reselect an SSB in the multiple SSBs for residing.

Optionally, the configuration information indicates the terminal device to stop residing on the frequency point of the first SSB, and indicates a correspondence relationship between M mod N and an index identifying each SSB in the multiple SSBs, wherein M represents an identity of the terminal device, N represents a quantity of the multiple SSBs, and mod represents a modulo operation.

Optionally, the configuration information indicates the terminal device to stop residing on the frequency point of the first SSB and indicates a load threshold of each SSB in the multiple SSBs.

Optionally, the configuration information indicates the terminal device to stop residing on the frequency point of the first SSB, and indicates the terminal device to select a second SSB for residing.

Optionally, the first system information is RMSI corresponding to the first SSB.

Optionally, the first system information and the second system information are the same system information.

It should be understood that the above wireless communication method 300 corresponds to corresponding acts in the method 200, and the acts in the above wireless communication method 300 may refer to description of the corresponding acts in the wireless communication method 200, which will not be repeated here for the sake of conciseness.

Therefore, in the wireless communication method of the implementations of the present disclosure, the network device indicates the frequency point position of each SSB other than the first SSB in the multiple SSBs through the first indication information, so that the terminal device may determine the frequency point position of each SSB in the multiple SSBs. Further, the network device indicates the terminal device to stop residing on the frequency point of the first SSB and indicates to reselect an SSB in the multiple SSBs for residing through the configuration information, so that the terminal device can redistribute the load on all SSBs, thus achieving a purpose of load balancing of the terminal device in the 5G NR broadband cell.

Figure 4:
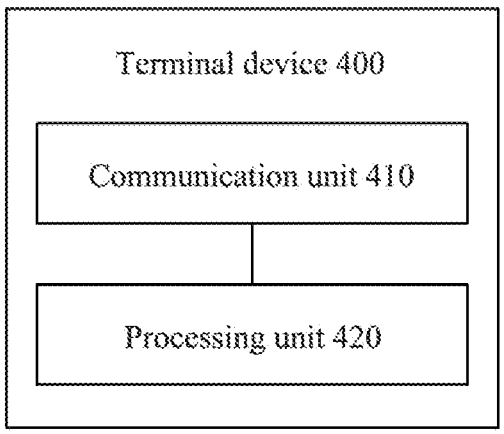
FIG. 4 is a schematic block diagram of a terminal device according to an implementation of the present disclosure.

FIG. 4 is a schematic block diagram of a terminal device 400 according to an implementation of the present disclosure. As shown in FIG. 4, the terminal device 400 resides on a frequency point of a first SSB in a broadband carrier of a first cell, and the broadband carrier of the first cell includes multiple SSBs including the first SSB.

The terminal device 400 includes a communication unit 410 and a processing unit 420.

The communication unit 410 is configured to acquire first system information broadcast by a network device from the first SSB, wherein the first system information includes first indication information indicating a frequency point position of each SSB other than the first SSB in the multiple SSBs relative to the first SSB, and/or an absolute frequency point position of each SSB other than the first SSB in the multiple SSBs.

The communication unit 410 is further configured to acquire second system information broadcast by the network device from the first SSB, wherein the second system information includes configuration information indicating the terminal device to stop residing on the frequency point of the first SSB and indicating to reselect an SSB in the multiple SSBs for residing.

The processing unit 420 is configured to determine a second SSB according to the configuration information, and reside on a frequency point of the second SSB according to a frequency point position of the second SSB indicated by the first indication information, wherein the second SSB is any one of the multiple SSBs.

Optionally, before the processing unit 420 determines the second SSB according to the configuration information, the communication unit 410 is further configured to acquire a paging message sent by the network device from the first SSB, wherein the paging message includes second indication information for triggering the terminal device to respond to the configuration information.

The processing unit 420 is specifically configured to trigger, according to the second indication information, to determine the second SSB according to the configuration information.

Optionally, the configuration information indicates the terminal device to stop residing on the frequency point of the first SSB, and indicates the terminal device to randomly reselect an SSB in the multiple SSBs for residing.

The processing unit 420 is specifically configured to stop residing on the frequency point of the first SSB and randomly select the second SSB in the multiple SSBs.

Optionally, the configuration information indicates the terminal device to stop residing on the frequency point of the first SSB, and indicates a correspondence relationship between M mod N and an index identifying each SSB in the multiple SSBs, wherein M represents an identity of the terminal device, N represents a quantity of the multiple SSBs, and mod represents a modulo operation.

The processing unit 420 is specifically configured to stop residing on the frequency point of the first SSB and determine the second SSB according to the correspondence relationship.

Optionally, the configuration information indicates the terminal device to stop residing on the frequency point of the first SSB and indicates a load threshold of each SSB in the multiple SSBs.

The processing unit 420 is specifically configured to randomly generate a random number, and determine the second SSB according to the random number and the load threshold of each SSB in the multiple SSBs.

Optionally, the configuration information indicates the terminal device to stop residing on the frequency point of the first SSB, and indicates the terminal device to select the second SSB for residing.

The processing unit 420 is specifically configured to determine the second SSB.

Optionally, the first system information is RMSI corresponding to the first SSB.

Optionally, the first system information and the second system information are the same system information.

It should be understood that the terminal device 400 may correspond to the terminal device in the method 200, and may implement corresponding operations implemented by the terminal device in the method 200. For the sake of conciseness, this will not be repeated here.

Figure 5:
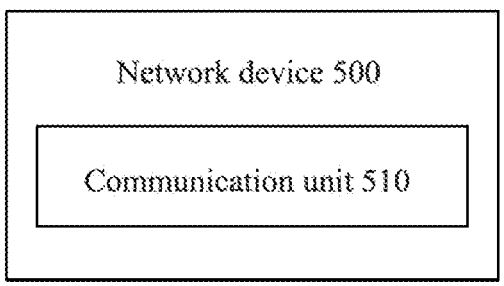
FIG. 5 is a schematic block diagram of a network device according to an implementation of the present disclosure.

FIG. 5 is a schematic block diagram of a network device 500 according to an implementation of the present disclosure. As shown in FIG. 5, at least one terminal device resides on a frequency point of a first SSB in a broadband carrier of a first cell, and the broadband carrier of the first cell includes multiple SSBs including the first SSB.

The network device 500 includes a communication unit 510.

The communication unit 510 is configured to broadcast first system information on the first SSB, wherein the first system information includes first indication information indicating a relative frequency point position of each SSB other than the first SSB in the multiple SSBs relative to the first SSB, and/or an absolute frequency point position of each SSB other than the first SSB in the multiple SSBs.

The communication unit 510 is further configured to broadcast second system information on the first SSB, wherein the second system information includes configuration information indicating the terminal device to stop residing on the frequency point of the first SSB and indicating to reselect an SSB in the multiple SSBs for residing.

Optionally, the second system information is used for triggering some or all of terminal devices residing on the frequency point of the first SSB to respond to the configuration information.

Optionally, the communication unit 510 is further configured to send a paging message to the terminal device on the first SSB, wherein the paging message includes second indication information for triggering a first terminal device to respond to the configuration information, and the first terminal device belongs to the at least one terminal device.

Optionally, the configuration information indicates the terminal device to stop residing on the frequency point of the first SSB, and indicates the terminal device to randomly reselect an SSB in the multiple SSBs for residing.

Optionally, the configuration information indicates the terminal device to stop residing on the frequency point of the first SSB, and indicates a correspondence relationship between M mod N and an index identifying each SSB in the multiple SSBs, wherein M represents an identity of the terminal device, N represents a quantity of the multiple SSBs, and mod represents a modulo operation.

Optionally, the configuration information indicates the terminal device to stop residing on the frequency point of the first SSB and indicates a load threshold of each SSB in the multiple SSBs.

Optionally, the configuration information indicates the terminal device to stop residing on the frequency point of the first SSB, and indicates the terminal device to select a second SSB for residing.

Optionally, the first system information is RMSI corresponding to the first SSB.

Optionally, the first system information and the second system information are the same system information.

It should be understood that the network device 500 may correspond to the network device in the method 300, and may implement corresponding operations implemented by the network device in the method 300. For the sake of conciseness, those will not be repeated here.

Figure 6:
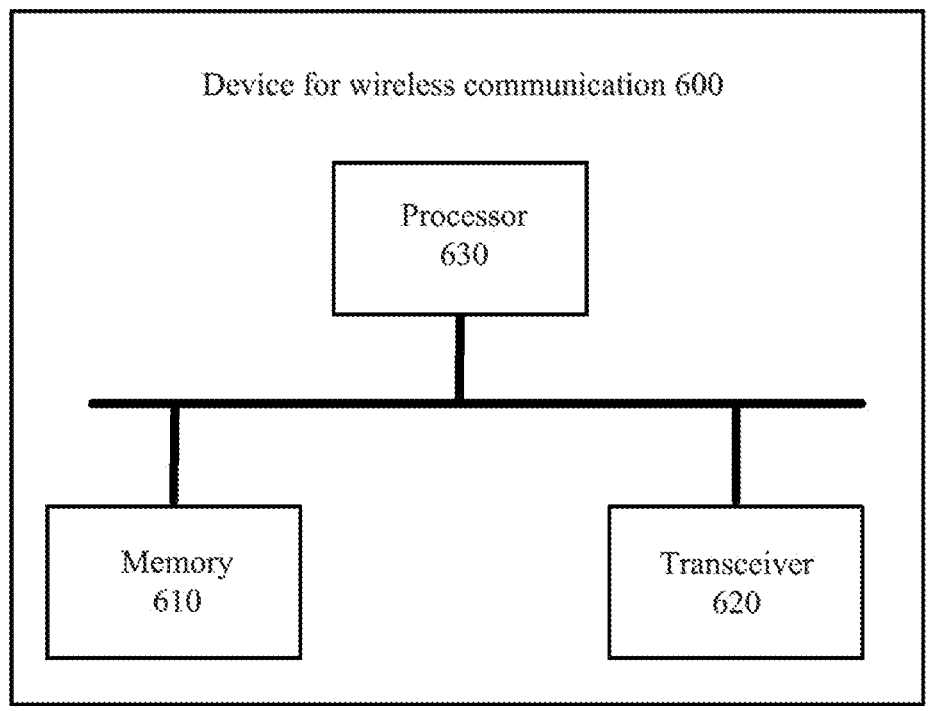
FIG. 6 shows a schematic block diagram of a device for wireless communication provided by an implementation of the present disclosure.

FIG. 6 shows a schematic block diagram of a device 600 for wireless communication provided by an implementation of the present disclosure. The device 600 includes: a memory 610 configured to store a program including codes; a transceiver 620 configured to communicate with other devices; and a processor 630 configured to execute program codes in the memory 610.

Optionally, the transceiver 620 is configured to perform specific transmitting and receiving of signals under the driving of the processor 630.

Optionally, when the codes are executed, the processor 630 may also implement various operations performed by the terminal device in the method 200 in FIG. 2, which will not be repeated here for conciseness. In this case, the device 600 may be a terminal device (e.g., a mobile phone).

Optionally, when the codes are executed, the processor 630 may also implement various operations performed by the network device in the method 300 in FIG. 3, which will not be repeated here for conciseness. In this case, the device 600 may be a network device (e.g., a base station).

It should be understood that in an implementation of the present disclosure, the processor 630 may be a Central Processing Unit (CPU), or the processor 630 may be other general purpose processors, digital signal processors (DSP), application specific integrated circuits (ASIC), Field programmable gate arrays (FPGA) or other programmable logic devices, discrete gate or transistor logic devices, discrete hardware components, etc. The general purpose processor may be a microprocessor, or the processor may be any conventional processor or the like.

The memory 610 may include a read-only memory and a random access memory, and provide instructions and data to the processor 630. A portion of memory 610 may include non-volatile random access memory. For example, the memory 610 may also store information of device type.

The transceiver 620 may be used for implementing signal transmission and reception functions, such as frequency modulation and demodulation functions, or up-conversion and down-conversion functions.

In an implementation process, at least one act of the method may be completed by an integrated logic circuit of hardware in the processor 630, or the integrated logic circuit may complete the at least one act under the driving of instructions in a form of software. Therefore, the device 600 for wireless communication may be a chip or chipset. The acts of the method disclosed in connection with an implementation of the present disclosure may be directly embodied to be completed by an execution of a hardware processor or by a combination of hardware and software modules in a processor. The software modules may be located in a storage medium commonly used in the art, such as a random access memory, flash memory, read-only memory, programmable read-only memory or electrically erasable programmable memory, or register. The storage medium is located in the memory, and the processor 630 reads the information in the memory and accomplishes the acts of the method in combination with its hardware. In order to avoid repetition, it will not be described in detail here.

Figure 7:
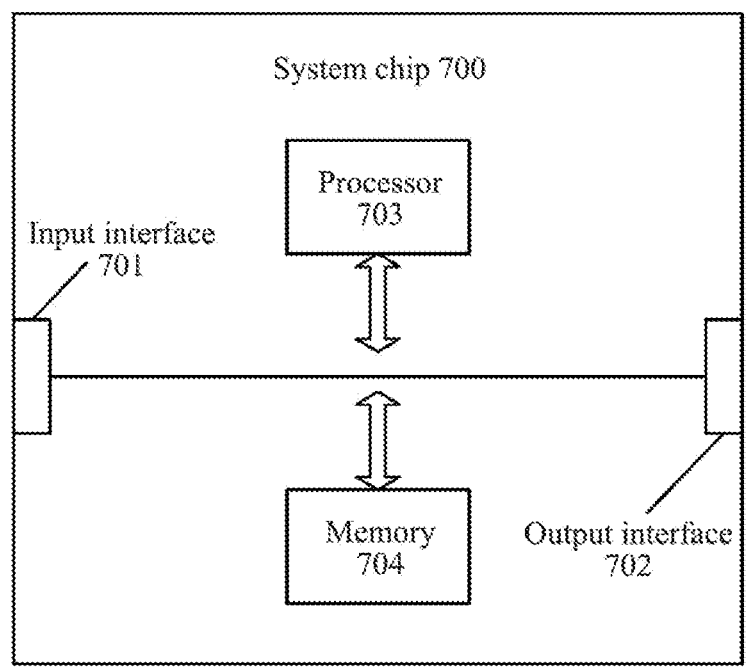
FIG. 7 is a schematic structural diagram of a system chip according to an implementation of the present disclosure.

FIG. 7 is a schematic structural diagram of a system chip 700 according to an implementation of the present disclosure. The system chip 700 in FIG. 7 includes an input interface 701, an output interface 702, a processor 703 and a memory 704, and the processor 703 and the memory 704 may be connected through internal communication connection lines, and the processor 1503 is used for executing codes in the memory 1504.

Optionally, when the codes are executed, the processor 703 implements the method performed by the terminal device in the method implementation. For the sake of conciseness, it will not be repeated here.

Optionally, when the codes are executed, the processor 703 implements the method performed by the network device in the method implementation. For the sake of conciseness, it will not be repeated here.

The implementations may be implemented in whole or in part by software, hardware, firmware, or any combination thereof. When the functions described in the implementations of the present disclosure are implemented through software, these functions may be implemented in whole or in part in a form of a computer program product. The computer program product includes one or more computer instructions. When the computer program instructions are loaded and executed on a computer, the processes or functions described in the implementations of the present disclosure are generated in whole or in part. The computer may be a general purpose computer, a special purpose computer, a computer network, or other programmable apparatus. The computer instructions may be stored in a computer-readable storage medium or transmitted from one computer-readable storage medium to another, for example, the computer instructions may be transmitted from one website site, computer, server or data center to another website site, computer, server or data center by a wired (e.g., coaxial cable, optical fiber, digital subscriber line (DSL)) or wireless (e.g., infrared, wireless, microwave and the like) manner. The computer-readable storage medium may be any available medium accessible by a computer or a data storage device such as a server, a data center, or the like that integrates one or more available media. The available medium may be a magnetic medium (e.g., floppy disk, hard disk, magnetic tape), an optical medium (e.g., DVD), or a semiconductor medium (e.g., Solid State Disk (SSD)) or the like.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

Those skilled in the art may clearly understand that for convenience and conciseness of description, the specific working processes of the system, apparatus and unit described above may refer to the corresponding processes in the aforementioned method implementations and will not be described here.

What are described above are merely specific implementations of the present disclosure, but the protection scope of the present disclosure is not limited thereto. Any change or substitution that may be easily conceived by a person skilled in the art within the technical scope disclosed by the present disclosure shall be included within the protection scope of the present disclosure. Therefore, the protection scope of the present disclosure shall be subject to that of the claims.

What is claimed is:

1. A wireless communication method, wherein a terminal device resides on a frequency point of a first synchronization signal block (SSB) in a broadband carrier of a first cell, a plurality of SSBs including the first SSB are comprised in the broadband carrier of the first cell; and
the method comprises:
acquiring, by the terminal device, first system information broadcast by a network device from the first SSB, wherein the first system information comprises at least one of first indication information indicating a frequency point position of each SSB other than the first SSB in the plurality of SSBs relative to the first SSB, or an absolute frequency point position of each SSB other than the first SSB in the plurality of SSBs;
acquiring, by the terminal device, second system information broadcast by the network device from the first SSB, wherein the second system information comprises configuration information indicating the terminal device to stop residing on the frequency point of the first SSB and indicating to reselect an SSB in the plurality of SSBs for residing; and
determining, by the terminal device, a second SSB according to the configuration information, and residing on a frequency point of the second SSB according to a frequency point position of the second SSB indicated by the first indication information, wherein the second SSB is any one of the plurality of SSBs.

2. The method of claim 1, wherein the method further comprises:
before determining, by the terminal device, the second SSB according to the configuration information, acquiring, by the terminal device, a paging message sent by the network device from the first SSB, wherein the paging message comprises second indication information for triggering the terminal device to respond to the configuration information; and
determining, by the terminal device, the second SSB according to the configuration information, comprises:
triggering, by the terminal device, to determine the second SSB according to the configuration information, according to the second indication information.

3. The method of claim 1, wherein the configuration information indicates the terminal device to stop residing on the frequency point of the first SSB, and indicates the terminal device to randomly reselect an SSB in the plurality of SSBs for residing; and
determining, by the terminal device, the second SSB according to the configuration information, comprises:
stopping, by the terminal device, residing on the frequency point of the first SSB, and randomly selecting the second SSB in the plurality of SSBs.

4. The method of claim 1, wherein the configuration information indicates the terminal device to stop residing on the frequency point of the first SSB, and indicates a correspondence relationship between M mod N and an index identifying each SSB in the plurality of SSBs, wherein the M represents an identity of the terminal device, the N represents a quantity of the plurality of SSBs, and the mod represents a modulo operation; and determining, by the terminal device, the second SSB according to the configuration information, comprises:
        stopping, by the terminal device, residing on the frequency point of the first SSB and determining the second SSB according to the correspondence relationship.

5. The method of claim 1, wherein the configuration information indicates the terminal device to stop residing on the frequency point of the first SSB and indicates a load threshold of each SSB in the plurality of SSBs; and determining, by the terminal device, the second SSB according to the configuration information, comprises:
        generating randomly, by the terminal device, a random number, and determining the second SSB according to the random number and the load threshold of each SSB in the plurality of SSBs.

6. The method of claim 1, wherein the configuration information indicates the terminal device to stop residing on the frequency point of the first SSB, and indicates the terminal device to select the second SSB for residing; and determining, by the terminal device, the second SSB according to the configuration information, comprises:
        determining, by the terminal device, the second SSB.

7. The method of claim 1, wherein the first system information is remaining system information (RMSI) corresponding to the first SSB.

8. The method of claim 1, wherein the first system information and the second system information are same system information.

9. A terminal device, wherein the terminal device resides on a frequency point of a first synchronization signal block (SSB) in a broadband carrier of a first cell, and a plurality of SSBs including the first SSB are comprised in the broadband carrier of the first cell; and the terminal device comprises:
        a transceiver, configured to:
            acquire first system information broadcast by a network device from the first SSB, wherein the first system information comprises at least one of first indication information indicating a frequency point position of each SSB other than the first SSB in the plurality of SSBs relative to the first SSB, or an absolute frequency point position of each SSB other than the first SSB in the plurality of SSBs; and
            acquire second system information broadcast by the network device from the first SSB, wherein the second system information comprises configuration information indicating the terminal device to stop residing on the frequency point of the first SSB and indicating to reselect an SSB in the plurality of SSBs for residing; and
        a processor, configured to determine a second SSB according to the configuration information, and reside on a frequency point of the second SSB according to a frequency point position of the second SSB indicated by the first indication information, wherein the second SSB is any one of the plurality of SSBs.

10. The terminal device of claim 9, wherein before the processor determines the second SSB according to the configuration information, the transceiver is further configured to acquire a paging message sent by the network device from the first SSB, wherein the paging message comprises second indication information for triggering the terminal device to respond to the configuration information; and the processor is further configured to:
        trigger, according to the second indication information, to determine the second SSB according to the configuration information.

11. The terminal device of claim 9, wherein the configuration information indicates the terminal device to stop residing on the frequency point of the first SSB, and indicates the terminal device to randomly reselect an SSB in the plurality of SSBs for residing; and the processor is further configured to:
        stop residing on the frequency point of the first SSB and randomly select the second SSB in the plurality of SSBs.

12. The terminal device of claim 9, wherein the configuration information indicates the terminal device to stop residing on the frequency point of the first SSB, and indicates a correspondence relationship between M mod N and an index identifying each SSB in the plurality of SSBs, wherein the M represents an identity of the terminal device, the N represents a quantity of the plurality of SSBs, and the mod represents a modulo operation; and the processor is further configured to:
        stop residing on the frequency point of the first SSB and determine the second SSB according to the correspondence relationship.

13. The terminal device of claim 9, wherein the configuration information indicates the terminal device to stop residing on the frequency point of the first SSB and indicates a load threshold of each SSB in the plurality of SSBs; and the processor is further configured to:
        generate randomly a random number, and determine the second SSB according to the random number and the load threshold of each SSB in the plurality of SSBs.

14. The terminal device of claim 9, wherein the configuration information indicates the terminal device to stop residing on the frequency point of the first SSB, and indicates the terminal device to select the second SSB for residing; and the processor is further configured to:
        determine the second SSB.

15. The terminal device of claim 9, wherein the first system information is remaining system information (RMSI) corresponding to the first SSB.

16. The terminal device of claim 9, wherein the first system information and the second system information are same system information.

17. A network device, wherein at least one terminal device resides on a frequency point of a first synchronization signal block (SSB) in a broadband carrier of a first cell, and a plurality of SSBs including the first SSB are comprised in the broadband carrier of the first cell; and the network device comprises:
        a transceiver, configured to:
            broadcast first system information on the first SSB, wherein the first system information comprises at least one of first indication information indicating a relative frequency point position of each SSB other than the first SSB in the plurality of SSBs relative to the first SSB, or an absolute frequency point position of each SSB other than the first SSB in the plurality of SSBs; and broadcast second system information on the first SSB, wherein the second system information comprises configuration information indicating the terminal device to stop residing on the frequency point of the first SSB and indicating to reselect an SSB in the plurality of SSBs for residing.

18. The network device of claim 17, wherein the second system information is used for triggering some or all of terminal devices residing on the frequency point of the first SSB to respond to the configuration information.

19. The network device of claim 17, wherein the transceiver is further configured to send a paging message to the terminal device on the first SSB, wherein the paging message comprises second indication information for triggering a first terminal device to respond to the configuration information, and the first terminal device belongs to the at least one terminal device.

20. The network device of claim 17, wherein the configuration information indicates the terminal device to stop residing on the frequency point of the first SSB, and indicates the terminal device to randomly reselect an SSB in the plurality of SSBs for residing.

* * * * *